(12) United States Patent
Rocco

(10) Patent No.: US 6,848,344 B2
(45) Date of Patent: Feb. 1, 2005

(54) ARTICULATING WRENCH ASSEMBLY

(76) Inventor: Anthony C. Rocco, 3 Spruceton Street La., Selden, NY (US) 11784

( * ) Notice: Subject to any disclaimer, the term of this patent is extended or adjusted under 35 U.S.C. 154(b) by 0 days.

(21) Appl. No.: 10/341,143

(22) Filed: Jan. 13, 2003

(65) Prior Publication Data

US 2003/0159549 A1 Aug. 28, 2003

Related U.S. Application Data

(60) Provisional application No. 60/347,363, filed on Jan. 11, 2002.

(51) Int. Cl.$^7$ .............................................. B25B 23/16
(52) U.S. Cl. ....................................... 81/177.8; 403/91
(58) Field of Search ............................. 81/177.1, 177.8, 81/177.9, 177.7; 403/298, 359.1, 359.3, 359.5, 359.6, 91–93, 95–97, 103, 107

(56) References Cited

U.S. PATENT DOCUMENTS

| | | | |
|---|---|---|---|
| 1,080,121 A | * 12/1913 | Oriol | 81/177.8 |
| 1,389,200 A | * 8/1921 | Linde | 81/177.9 |
| 2,517,045 A | 8/1950 | Soule | |
| 2,657,412 A | 11/1953 | Carlson | |
| 2,668,973 A | 2/1954 | Glaza et al. | |
| 2,679,657 A | 6/1954 | Krueger | |
| 2,823,404 A | 2/1958 | Hyman | |
| 2,921,773 A | * 1/1960 | Hoelzer | 81/177.8 |
| 3,103,680 A | 9/1963 | Krichmar | |
| 3,448,486 A | 6/1969 | Wright | |
| 3,868,742 A | 3/1975 | Brenner | |
| 3,879,139 A | 4/1975 | Dahl et al. | |
| 4,020,521 A | 5/1977 | Velasquez | |
| 4,128,910 A | 12/1978 | Nakata et al. | |
| 4,227,276 A | 10/1980 | Ginsburg et al. | |
| 4,362,174 A | 12/1982 | Baker et al. | |
| 4,582,445 A | 4/1986 | Warshawsky | |
| 4,731,896 A | 3/1988 | de La Tour | |
| 4,780,924 A | 11/1988 | Hansen et al. | |
| 4,829,621 A | 5/1989 | Phenegar | |
| 4,890,349 A | 1/1990 | Nitzsche | |
| 4,890,732 A | 1/1990 | Shackelford | |
| 4,905,946 A | 3/1990 | Wang | |
| 4,929,113 A | 5/1990 | Sheu | |
| 5,005,246 A | 4/1991 | Yen-Hui | |
| 5,010,906 A | 4/1991 | Preciutti | |
| 5,033,154 A | 7/1991 | Marchand et al. | |
| 5,044,948 A | 9/1991 | Vance, Sr. et al. | |
| 5,109,563 A | 5/1992 | Lemon et al. | |
| 5,144,712 A | 9/1992 | Hansel et al. | |
| 5,165,135 A | 11/1992 | Su | |
| 5,263,507 A | 11/1993 | Chuang | |
| 5,442,831 A | 8/1995 | Yamada | |
| 5,581,838 A | * 12/1996 | Rocco | 403/91 |
| 5,768,960 A | * 6/1998 | Archuleta | 81/177.8 |
| 5,870,932 A | * 2/1999 | Brooke | 81/177.8 |
| 5,943,925 A | * 8/1999 | Huang | 81/177.8 |
| 6,401,576 B1 | * 6/2002 | Wu | 81/177.8 |

* cited by examiner

Primary Examiner—Debra S Meislin
(74) Attorney, Agent, or Firm—Carter, DeLuca, Farrell & Schmidt, LLP

(57) ABSTRACT

There is provided an articulating tool assembly for performing a mechanical task in a confined area, e.g., applying the torque to install or remove nuts threaded onto machine bolts or other hooks in confined or recessed areas. The articulating tool assembly has an elongated body portion having a handle section and a yoke section, a head portion including a head section and a head retaining section, and an actuation member defining an axle shaft with two spaced apart sprockets. The actuation member is provided for effectuating incremental articulating movements of the wrench head portion with respect to the elongated wrench body portion.

8 Claims, 5 Drawing Sheets

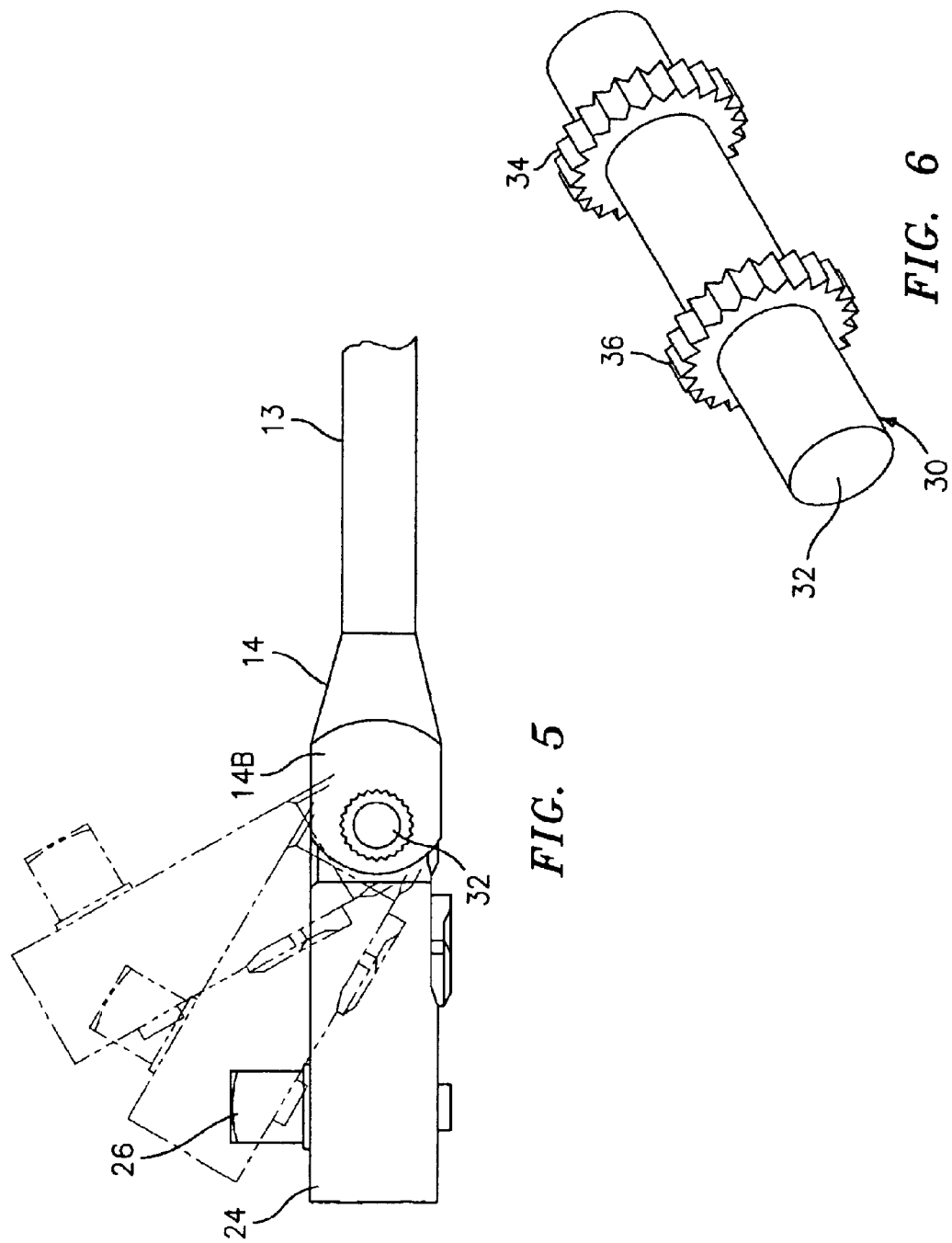

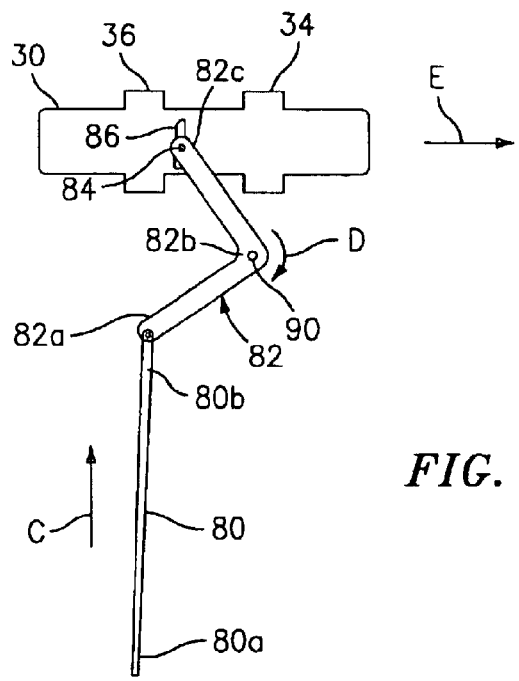
FIG. 8
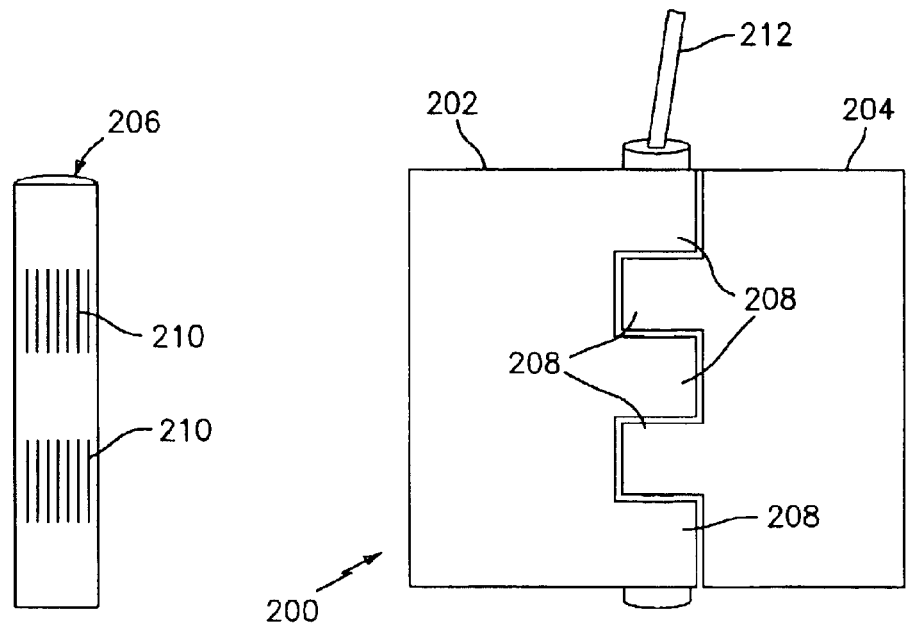
FIG. 10
FIG. 9

ARTICULATING WRENCH ASSEMBLY

This application claims priority from provisional application Ser. No. 60/347,363, filed Jan. 11, 2002, incorporated herein by reference in its entirety.

BACKGROUND OF THE INVENTION

1. Field of the Invention

The present invention relates to an articulating tool assembly. More particularly, the present invention relates to an articulating tool assembly of the socket driver type having an articulating head portion that is selectively movable into a plurality of angular orientations with respect to a body portion. The present invention also relates to an articulating tool assembly having a body portion including one or more articulating members.

2. Description of the Related Art

It is often necessary to install a nut onto or remove a nut from a machine bolt in a confined area or to perform some other task using a tool in a confined area. For example, conventional ratchet wrenches are not suitable for use in confined areas because restricted access to the confined space interferes with the back and forth motion of the wrench handle or because a mechanic cannot access the confined area in such a way as to transmit the necessary torque to the wrench handle to facilitate the nut installation or removal process. Accordingly, there is a need for a simple, convenient, economical tool, such as a wrench, capable of adapting to use in a confined area to allow a user to operate the tool and perform the necessary tasks, e.g., the removal or installation of nuts.

SUMMARY OF THE INVENTION

An object of the present invention is to provide a novel type of articulating tool assembly, which is simple to manufacture and convenient to use. In one preferred embodiment, the articulating tool assembly includes an articulating ratchet wrench assembly including a socket driver.

In accordance with the present invention, the articulating tool assembly has an elongated body portion having a handle section and a yoke section with first and second opposed yoke arms. Preferably, at least one of the yoke arms has a toothed aperture. A head portion includes a head section and a head retaining section having a bore which partly consists of teeth. An actuation member defines an axle shaft with two spaced apart sprockets. The axle shaft extends through the toothed apertures of the two yoke arms and the bore of the head retaining section. In an engaged position, the first sprocket of the axle shaft engages the toothed aperture of the first yoke arm and a first toothed area of the bore of the head retaining section, while the second sprocket engages the toothed aperture of the second yoke arm and a second toothed area of the bore of head retaining portion. In this position, the actuation member prevents articulation of the head portion of the tool assembly in relation to the elongated body portion. In the disengaged position, the second sprocket is rotatably positioned within a raceway area of the bore of the head retaining portion while the first sprocket engages only the toothed aperture of the first yoke arm. In this position, the head portion is free to articulate in relation to the elongated body portion. Alternatively, in the disengaged position, the first sprocket may engage only the raceway area of the bore of the head retaining section while the second sprocket may engage only a toothed aperture of the second yoke arm.

It is envisioned that two or more yoke sections may be provided along the length of the elongated body portion to provide a tool having a plurality of areas of articulation.

Therefore, users can easily utilize the adjustable articulating tool for accessing a confined area by using the articulated movements of the tool head portion with respect to the elongated body portion to perform a desired task, e.g., to tighten and loosen bolts.

BRIEF DESCRIPTION OF THE DRAWINGS

The above objects and other advantages of the present invention will become more apparent from the following detailed description taken in conjunction with the accompanying drawings, in which:

FIG. 5 illustrates a side elevational view showing various selected positions of the wrench head portion of the ratchet wrench assembly of the present invention;

FIG. 6 illustrates a perspective view of an actuation member of the ratchet wrench assembly of the present invention;

FIG. 8 is a schematic diagram of a linkage assembly for remotely actuating the actuation member of the presently disclosed wrench assembly;

FIG. 9 is a side view of another preferred embodiment of the presently disclosed invention; and FIG. 10 is a side view of the actuation member of the embodiment of the invention shown in FIG. 9.

DETAILED DESCRIPTION OF PREFERRED EMBODIMENTS

Figure 1:
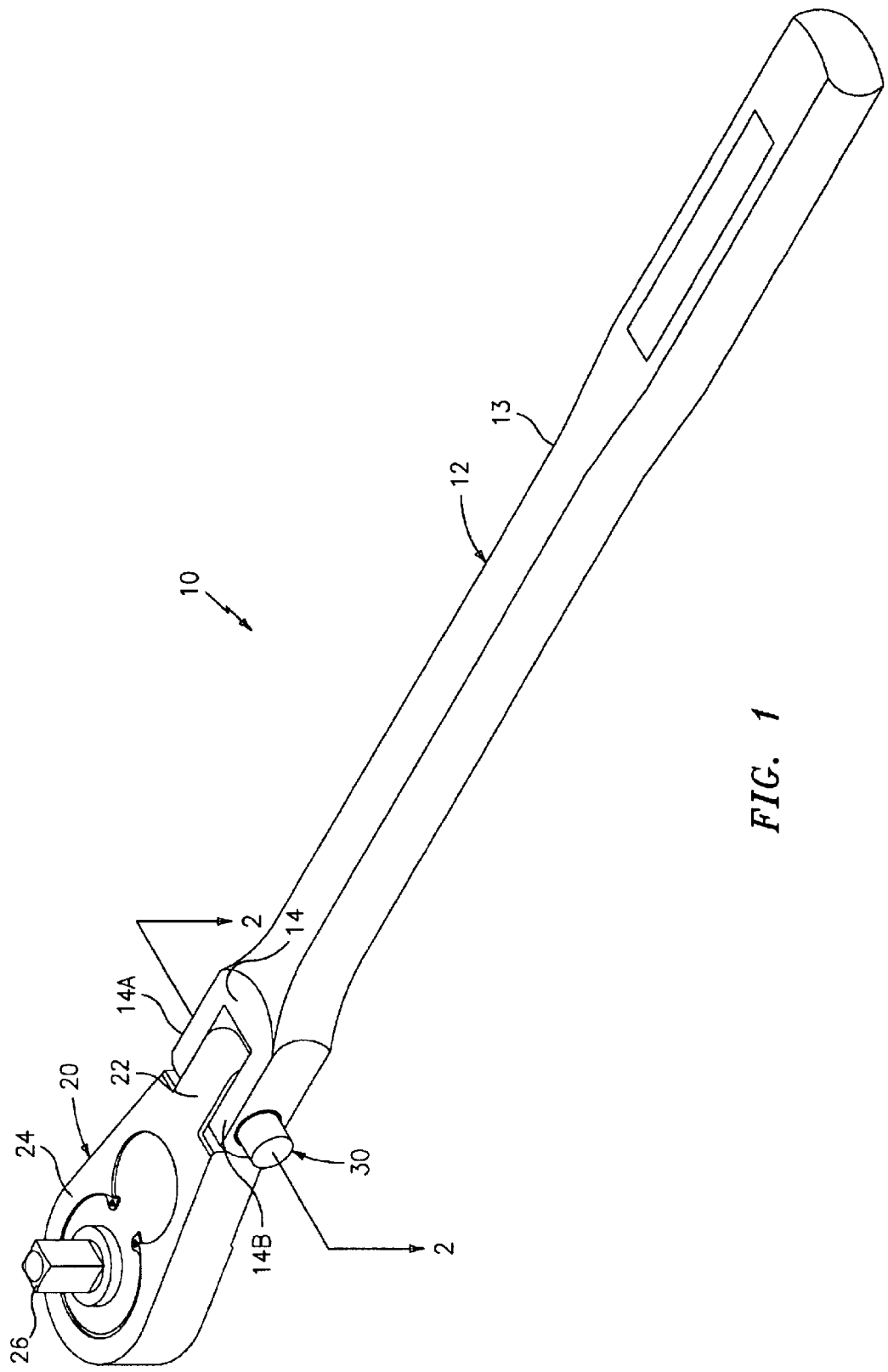
FIG. 1 illustrates a perspective view of an articulating ratchet wrench assembly constructed in accordance with a preferred embodiment of the present invention.

A preferred embodiment of the present invention will be described hereinbelow with reference to the accompanying drawings. In the following description, like reference numerals identify similar or identical elements throughout the several views, while well-known functions or constructions are not described in detail so as not to obscure the invention in unnecessary detail. Although this description refers specifically to an articulating wrench assembly, it is to be understood that this disclosure may be incorporated into other tool assemblies, e.g., screw drivers, magnetic retrieval devices, prying devices, hammers, paint brushes, a variety of different medical and/or surgical tools, articulating devices, etc.

Referring to FIG. 1, the articulating wrench assembly 10 essentially comprises an elongated body portion 12, a wrench head portion 20 and an actuation member 30. The elongated body portion 12 defines an ergonomically configured wrench handle section 13 along a major portion thereof and a yoke section 14 at a front or distal end thereof. The yoke section 14 of the elongated body portion 12 has two opposed yoke arms 14A, 14B. The wrench head portion 20 includes a socket adaptor 26, a wrench head section 24 and a wrench head retaining section 22. The elongated body portion 12 may include an additional yoke section or sections along the length thereof to provide multiple areas of articulation on the tool assembly. Each area of articulation would preferably include an actuation member to control articulation of the tool assembly.

Figure 2:
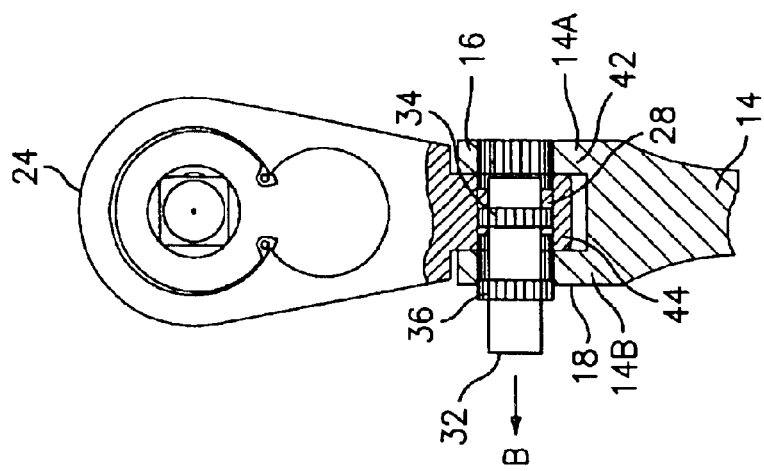
FIG. 2 illustrates a plan view, in partial cut-away, of a yoke section, a wrench head portion, and an actuation member disposed in an engaged position of the ratchet wrench assembly of FIG. 1.
Figure 3:
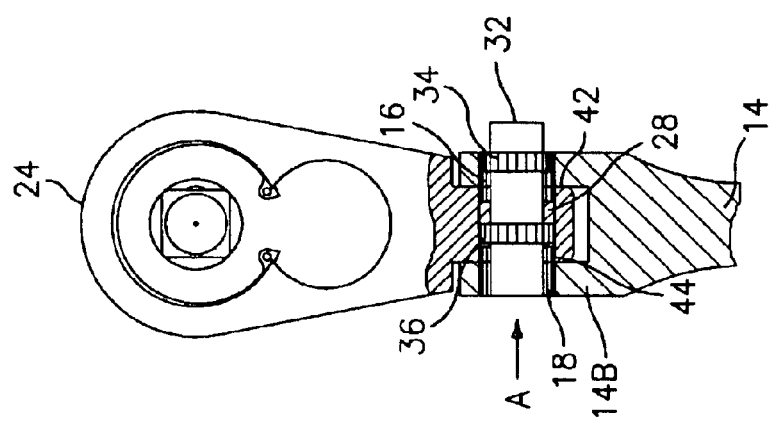
FIG. 3 illustrates a plan view, in partial cut-away, of a yoke section, a wrench head portion and an actuation member moved into a disengaged position to permit movement of the wrench head portion relative to the elongated body portion of the ratchet wrench assembly of FIG. 1.
Figure 4:
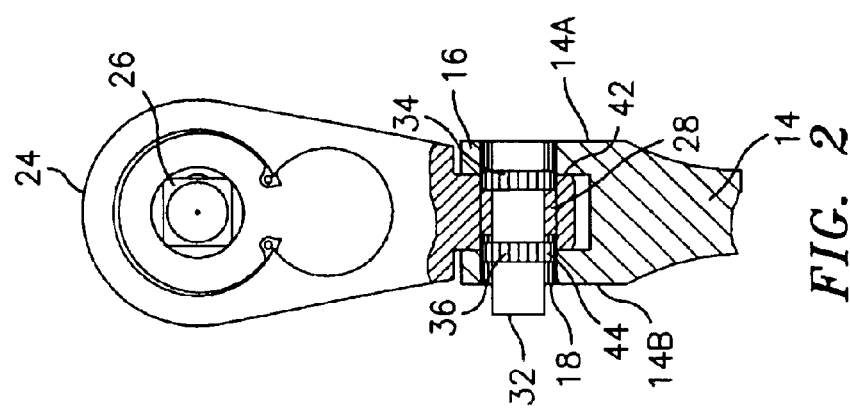
FIG. 4 illustrates a plan view, in partial cut-away, of a yoke section, a wrench head portion and an actuation member moved into another disengaged position to permit movement of the wrench head portion relative to the elongated body portion of the ratchet wrench assembly of FIG. 1.
Figure 7:
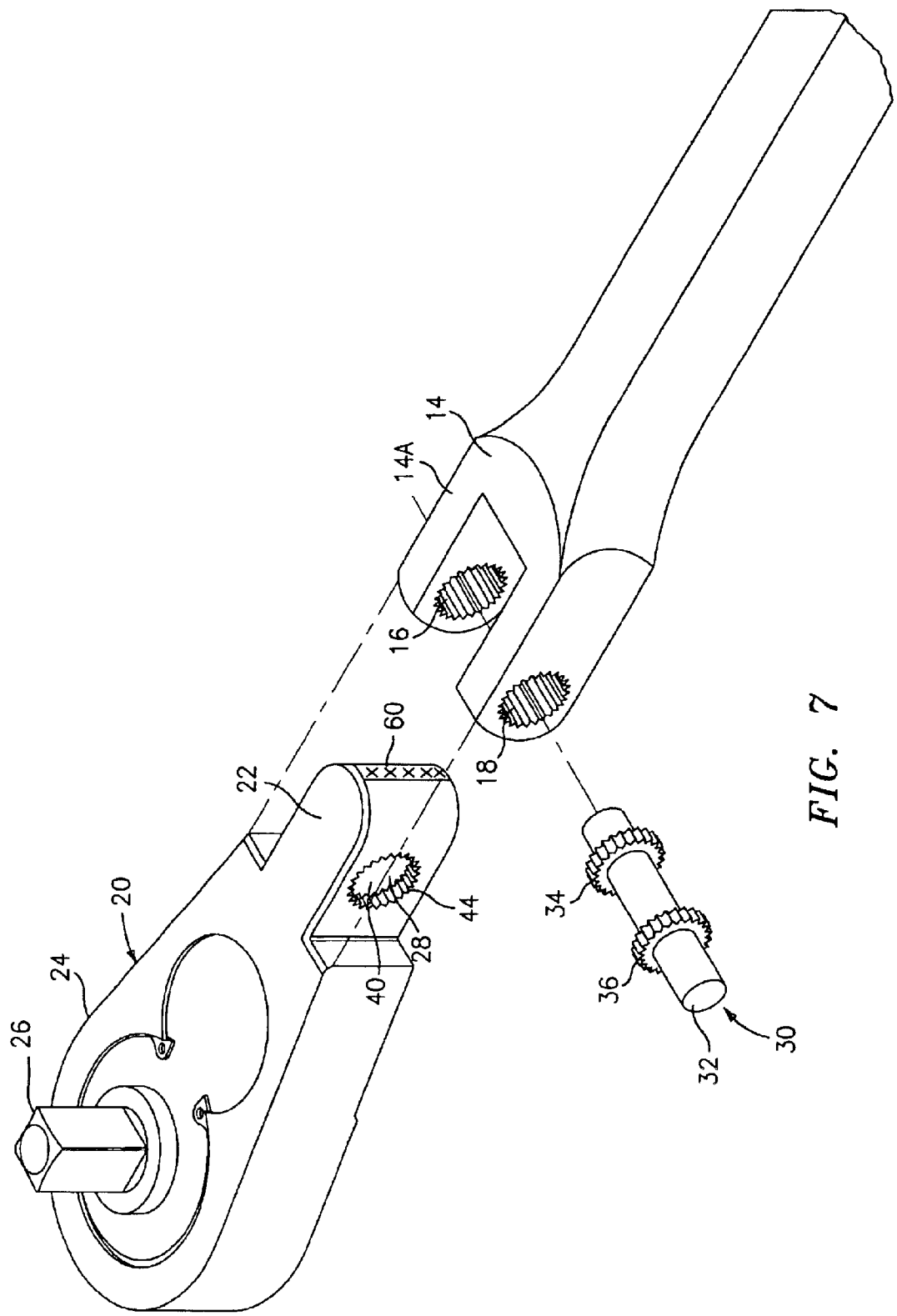
FIG. 7 illustrates an exploded perspective view of the ratchet wrench assembly of the present invention.

Referring now to FIGS. 6 and 7, the yoke section 14 of the elongated body portion 12 has two opposed yoke arms 14A, 14B, at least one of which includes an engagement area, e.g., a toothed aperture 16, 18 which extends at least partially through a respective yoke arm 14A, 14B. In a preferred embodiment, both yoke arms 14A and 14B include toothed apertures. The wrench head portion 20 includes a wrench head section 24 and a wrench head retaining section 22 which has a bore 40 consisting of first and second spaced apart engagement areas, e.g., annular toothed areas 42 and 44 (See FIGS. 2, 3 and 4) and an annular raceway area 28 with no teeth positioned between annular toothed areas 42 and 44. Actuation member 30 includes an axle shaft 32 extending through the toothed apertures 16 and 18 of two yoke arms 14A and 14B and the bore 40 of the wrench head retaining section 22 (See FIGS. 1 and 7). The actuation member 30 is utilized to control articulated movement of the wrench head portion 20 with respect to the elongated body portion 12 (See FIG. 5) and includes first and second locking members or sprockets 34 and 36. Each sprocket 34 and 36 has a plurality of annularly disposed gear teeth which are configured to interact with complementary toothed engagement areas 16, 18, 42, 44 formed within the yoke arms 14A and 14B and the wrench head retaining section 22. Alternately, the number of teeth provided on the sprocket may differ from the number of teeth provided on the yoke arms and/or the wrench head retaining portion, i.e., only a single tooth may be provided on the sprocket (or the yoke arms and/or the wrench head retaining portion). Toothed areas 16 and 18 of the aperture of yoke arms 14A and 14B and toothed areas 42 and 44 of bore 40 of wrench head retaining section 22 should be configured to receive sprockets 34 and 36. In a preferred embodiment, sprockets 34 and 36 provided on axle shaft 32 have the same number of teeth formed thereon as the toothed areas 16, 18, 42 and 44. Alternately, only one sprocket may be provided on the axle shaft and only a single toothed area may be provided on each of retaining section 22 and yoke section 14. In such an embodiment, the teeth of the one sprocket are dimensioned to simultaneously engage the teeth on both retaining section 22 and one of yoke arms 14A and 14B. The number of the spaced apart annular toothed areas and the spaced annular raceway areas of the bore 40 will be determined based upon the number of sprockets. The size and the number of teeth of the first sprocket 34 may be different from those of the second sprocket 36 provided each sprocket is configured to engage apertures or recesses of a corresponding yoke arm or arms 14A and 14B and the toothed areas 42 and 44 of bore 40 of the wrench head retaining section 22, respectively. The axle shaft 32 may define a tapered shape to prevent sliding of the axle shaft 32 out of one side of yoke section 14. Any type of interlocking teeth can be used on the toothed areas 16, 18, 42, 44, and sprockets 34, 36. For example, the gear teeth may be triangular, spherical, conical, etc. FIGS. 2, 3, and 4 illustrate the positions of the axle shaft 32 with spaced apart sprockets 34 and 36 which extend through toothed apertures 16 and 18 of yoke arms 14A and 14B and bore 40 of wrench head retaining section 22. Sprockets 34 and 36 are provided on axle shaft 32 for controlling incremental articulation of wrench head portion 20 with respect to elongated body portion 12. The width of each of sprockets 34 and 36 is narrower than that of spaced annular raceway area 28 of wrench head retaining section 22 to permit articulation of wrench head portion 20 in relation to elongated body portion 12 when one of the sprockets 34 and 36 is moved into raceway area 28.

As seen in FIG. 2, when moved into an engaged position, first sprocket 34 simultaneously engages toothed aperture 16 of first yoke arm 14A and first toothed area 42 of bore 40 of wrench head retaining section 22, while the second sprocket 36 simultaneously engages toothed aperture 18 of second yoke arm 14B and second toothed area 44 of bore 40 of wrench head retaining section 22. At such a time, the wrench head portion 20 is locked against rotation of any desired position and the wrench can be used for installing or removing a nut or performing some other mechanical operation. Alternately, only a single sprocket need be provided.

As seen in FIG. 3, when axle shaft 32 is pushed in a first direction indicated by arrow "A", first sprocket 34 disengages from first toothed area 42 of bore 40 of wrench head retaining section 22 and is engaged only in toothed aperture 16 of first yoke arm 14A, and second sprocket 36 moves into raceway area 28 of bore 40 of wrench head retaining section 20 where there are no teeth to engage. In this position, i.e., the disengaged position, wrench head portion 20 can be freely articulated relative to body portion 12 of articulating wrench assembly 10, since wrench head portion 20 can be rotated about axle shaft 32 to change the angular position of wrench head portion 20 in relation to body portion 12 can be adjusted.

Alternatively, as seen in FIG. 4, actuation shaft 32 can be moved into the disengaged position by moving axle shaft 32 in a direction indicated by arrow "B" such that second sprocket 36 disengages from second toothed area 44 of bore 40 of wrench head retaining section 22 and engages toothed aperture 18 of second yoke arm 14B, while first sprocket 34 disengages from toothed aperture 16 of first yoke arm 14A and from first toothed area 42 of bore 40 of wrench head retaining section 22, and moves into raceway area 28 of bore 40 where there are no teeth. Wrench head portion 20 can also be freely articulated relative to body portion 12 of the articulating wrench assembly 10 in this position. Thereupon, the wrench head portion can be moved into a desired angular orientation and thereafter retained in the desired position via movement of actuation member 30 to the position shown in FIG. 2.

The two disengaged positions can be selected by manually pushing or pulling on actuation member 30. Actuation member 30 can be pushed or pulled by the user or by other means, such as a mechanism including a biasing spring or a remotely actuated mechanism. For example, a linkage assembly may be provided to facilitate movement of actuation member 30 between engaged and disengaged positions from handle section 13. One preferred embodiment of the linkage assembly illustrated in FIG. 8 includes a linear translatable link 80 and a pivotal lever 82. Link 80 is slidably positioned within a bore (not shown) in elongated body portion 12 and includes a proximal end 80a and a distal end 80b. Proximal end 80a preferably includes a finger engagement member 81 which is accessible from handle section 13 to facilitate translation of link 80 from a retracted to an advanced position. Distal end 80b of link 80 is pivotally secured to one end 82a of pivotal lever 82. A central portion 82b of lever 82 is pivotally secured about pin 90 to elongated body portion 12. The other end 82c of lever 82 is slidably secured to actuation member 30 by a pin 84 slidably positioned within a slot 86 formed in actuation member 30. Wrench head portion 20 must be adapted to facilitate connection of lever 82 to actuation member 30 (not shown). In use, when link 80 is advanced in the direction indicated by arrow "C", lever 82 is pivoted about pin 90 in the direction indicated by arrow "D" such that pin 84 urges actuation member 30 in the direction indicated by arrow "E". As actuation member 30 moves in the direction indicated by arrow E, pin 84 moves upwardly in slot 86.

It is also envisioned that axle shaft 32 may have protrusions or extensions, e.g., a gripping member or O-ring, at the either or both ends thereof so that the actuation member 30 can be more easily manipulated. In an alternate embodiment, a protrusion or protrusions 60 may be formed and positioned on the wrench retaining section 22 (and/or yoke section 14) to contact an inner wall of yoke section 14, e.g., a rubber surface, etc. Contact between protrusions 60 and the inner wall of yoke section 14 provides a frictional resistance to articulation when the actuation shaft is in the disengaged position to prevent head portion 20 from flopping around in relation to body portion 12. Alternately, a resilient pad may be substituted for protrusions 60 to increase the frictional contact between retaining section 22 and yoke section 14.

FIG. 5 shows various selectively adjustable positions of wrench head portion 20 relative to body portion 12 of wrench assembly 10. The number of articulated positions of the wrench assembly will depend upon the number of teeth provided on sprockets 34 and 36 on the axle shaft 32, and/or in bore 40 and/or apertures 16 and 18 of yoke 14. The number of teeth may vary, preferably from as few as one to as many as fifty. Depending on the number of teeth, the number of the selective positions of the articulating wrench is decided. In a preferred embodiment of the present inventions, twenty-six teeth are provided on each sprocket of the axle shaft 32 so that the wrench head portion 20 can be oriented into an incremental position every 13.85°. Alternately, more or fewer teeth may be provided to provide a greater or lesser increments of articulation of head portion 20.

It is envisioned that a movable actuator such as described above may be suitable for use in a variety of other types of articulatable devices to control articulation of a component of the device. For example, in one preferred embodiment a hinge 200 shown in FIGS. 9 and 10, includes a first hinge member 202, a second hinge member 204 and an actuation member or hinge pin 206. Each hinge member includes a plurality circular lobes 208 for receiving actuation member or hinge pin 206. At least one and, preferably a plurality of circular lobes 208 on each hinge member includes engagement structure (not shown). Hinge pin 206 also includes engagement structure 210 positioned to releasably engage the engagement structure of circular lobes 208. Hinge pin 206 is movable between a first position in which the engagement structure of the at least one circular lobe of each hinge member 202 and 204 is engaged by engagement structure 210 of hinge pin 206 and a second disengaged position in which engagement structure 210 engages the engagement structure of only one of the first and second hinge members. In the second disengaged position, first hinge member 202 can be articulated with respect to second hinge member 204. In the first position, engagement structure 210 prevents articulation of first hinge member 202 in relation to second hinge member 204. As discussed above, the engagement structure 210 on hinge pin 206 and the engagement structure on circular lobes 208 of hinge members 204 and 206 preferably includes an annular array of teeth. As discussed above, the engagement structure may include other known interlocking configurations.

Hinge pin 206 can be manually moved between the engaged and disengaged positions. Alternately, a link 212 can be used to fasten one or both ends of pin 206 to a suitable drive mechanism, e.g., motor, solenoid, etc. Although illustrated as a hinge assembly, the assembly shown in FIGS. 9 and 10 may be formed integrally with any articulation assembly. For example, the first hinge member may be in the form of a door, whereas the second hinge member may be in the form of a door jam.

Although the invention has been described in its preferred form with a certain degree of particularity, variations and modifications may be made therefrom within the scope of the accompanying claims without departing from the principle of the invention and without sacrificing its chief advantages.

What is claimed is:

1. An articulation wrench assembly comprising:
   an elongated body portion having a proximal handle section and a distal yoke section, the distal yoke section including a pair of yoke arms, each yoke arm including a first engagement area;
   a wrench head portion including a wrench retaining section, the wrench retaining section being dimensioned to be received between the pair of yoke arms and including a throughbore having a pair of spaced apart second engagement areas; and
   an actuation member movably supported between the pair of yoke arms and including a pair of locking members, wherein the wrench head portion is rotatably supported about the actuation member to facilitate articulation of the wrench head portion in relation to the elongated body portion and the actuation member is movable between the yoke arms from a first engaged position in which each locking member is in engagement with a respective first and second engagement area, to prevent articulation of the wrench head portion in relation to the elongated body portion, to a second non-engaged position in which each locking member is disengaged from at least one of the first engagement area and the pair of spaced apart second engagement areas, to permit articulation of the wrench head portion in relation to the elongated body portion.

2. An articulation wrench assembly according to claim 1, wherein the wrench head portion includes a socket adaptor.

3. An articulation wrench assembly according to claim 1, wherein the first and second engagement areas include first and second toothed areas and the locking member includes at least one sprocket including structure configured to engage the first and second toothed areas.

4. An articulation wrench assembly according to claim 1, wherein the structure on the locking members include gear teeth.

5. An articulation wrench assembly according to claim 1, further including an actuation mechanism operably connected to the actuation member, the actuation mechanism being operable to move the actuation member between the first engaged position and the second non-engaged position via movement of an actuator positioned on the proximal handle section of the elongated body.

6. An articulation assembly according to claim 5, wherein the actuation mechanism includes a translatable link supported by the elongated body and a pivotal lever fastened to the elongated body, the pivotal lever having a first end connected to the translatable link and a second end connected to the actuation member.

7. An articulation wrench assembly according to claim 1, wherein each of the locking members includes a sprocket having a plurality of teeth.

8. An articulation wrench assembly according to claim 7, wherein each of the engagement areas of the yoke arms and the wrench retaining section includes a plurality of teeth dimensioned to engage the teeth of a respective sprocket of one of the actuation member.

* * * * *